United States Patent [19]

Powell et al.

[11] Patent Number: 4,893,877

[45] Date of Patent: Jan. 16, 1990

[54] SELF-GENERATED LIGHTED HUBCAB

[75] Inventors: Manual Powell, 8210 Woodlawn Ave., Detroit, Mich. 48213; Lawrence J. Goffney, Jr., Detroit, Mich.

[73] Assignee: Manual Powell, Detroit, Mich.

[21] Appl. No.: 235,179

[22] Filed: Aug. 23, 1988

[51] Int. Cl.$^4$ .............................................. B60Q 1/26
[52] U.S. Cl. ............................ 301/108 R; 301/37 R; 310/67 A; 362/78
[58] Field of Search ............. 301/37 R, 37 CM, 37 N, 301/37 S, 108 R, 108 TW, 108 S; 362/35, 78, 800, 806; 310/67 A, 68 B

[56] References Cited

U.S. PATENT DOCUMENTS

| | | | |
|---|---|---|---|
| 3,548,185 | 12/1970 | Hall | 301/37 N |
| 4,298,910 | 11/1981 | Price | 301/5.7 X |
| 4,363,502 | 12/1982 | Bakerman | 301/5.7 X |
| 4,539,496 | 9/1985 | Thomas et al. | 310/67 A X |
| 4,725,928 | 2/1988 | Strepek | 362/78 |
| 4,775,919 | 10/1988 | Pearsall et al. | 362/78 |

FOREIGN PATENT DOCUMENTS

| | | | |
|---|---|---|---|
| 2729446 | 1/1979 | Fed. Rep. of Germany | 310/67 A |
| 169815 | 9/1934 | Switzerland | 310/67 A |
| 263173 | 8/1949 | Switzerland | 310/67 A |
| 86/04308 | 7/1986 | World Int. Prop. O. | 362/78 |

Primary Examiner—Russell D. Stormer
Attorney, Agent, or Firm—Dykema Gossett

[57] ABSTRACT

A lighted hubcap includes a cap body that has an outboard side and an opposing inboard side. When the cap body is secured to the wheel of a passenger vehicle, the outboard side faces away from the vehicle. At least one light emitter is incorporated in the cap body so that it emits light from the outboard side of the cap body when energized. A permanent magnet assembly is pivotally secured to the cap body and weighted so that the permanent magnet assembly is in a generally fixed orientation with respect to the passenger vehicle. Electrically conducting windings are secured to the inboard side concentrically about the permanent magnet assembly and are connected to the light emitters. The windings are in magnetic flux coupling relationship with the permanent magnet assembly so that upon rotation of the wheel and, concomitantly, the windings about the generally fixedly oriented permanent magnet assembly, alternating current is generated in the winding for energizing the light emitters.

3 Claims, 1 Drawing Sheet

SELF-GENERATED LIGHTED HUBCAB

FIELD OF THE INVENTION

The present invention relates generally to hubcaps for wheeled passenger vehicles and more particularly to lighted hubcaps. Still more particularly the invention relates to a lighted hubcap that has a self-contained generator to provide electrical energy for running lights that are energized when a wheel, upon which the hubcap is mounted, rotates.

BACKGROUND OF THE INVENTION

For a number of years, at least since government safety regulations for the automobile industry has provided an incentive, automobile manufacturers have used running lights on the sides of passenger vehicles as an added measure of safety for the vehicles when driven at night. These lights, conventionally energized by the battery generated electrical systems of the vehicles, are usually switched on and off with the ignition system and front and rear lights.

There are a number of disadvantages associated with the inclusion of side running lights in the front and rear light systems, that is, head and tail light systems, and with the inclusion of the ignition system of an automobile. As one, the running lights do not come on when the electrical system of the car fails, so that, if at night the car is coasting—for example, if it is being pushed or is moving down an incline—the running lights are not available as a safety measure. As another, the vehicle owner is often left to the whim of the automobile manufacturer as it concerns the amount of light made available by side running lights because of the inconvenience of tying additional lights into the electrical system of the vehicle.

Both of these disadvantages can be overcome by a lighting apparatus for a vehicle that can be conveniently put onto the vehicle in a position at which it can provide side running lights. A lighted hubcap would, to an extent, fit the following parameters: it would be positioned on the side of the vehicle, and it would be placable with little inconvenience if proper consideration were given to developing an independent power source for the lights.

Conventional technology would not serve to provide, however, a wholly convenient independent power source for the lights. Lights that are battery operated, for example by small cell power sources, would be independent, but would have other inconveniences, as requiring multiple switches or that the lights of all of the hubcaps be tied together in a single circuit so that the lights could be controlled by a single switch and as requiring that the batteries or cells be replaced frequently.

A solution to providing an independent power source to lights for a wheel element lies outside of the art. U.S. Pat. No. 4,298,910 issued to Price on Nov. 3, 1981, teaches using a self-contained generator that has a permanent magnet assembly secured in flux coupling relationship with electrically conducting windings to provide electricity for energizing light emitting diodes. While the teachings of Price provide some background from which the present invention has been conceived, the teachings are devoid of suggesting a means for forming a flux coupling relationship between the magnet and windings in a unit body that can be snapped onto a rotatable wheel as a hubcap is snapped onto a wheel of a passenger vehicle.

OBJECTS OF THE INVENTION

Accordingly, it is the primary object of the present invention to provide a hubcap that has a self-contained generator to provide electrical energy to running lights that are energized when a wheel, upon which the hubcap is mounted, rotates.

Associated with the primary object is an object of providing a means of forming a flux coupling relationship between the magnet and windings in a unit body that can be snapped onto a rotatable wheel as a hubcap is snapped onto, as an example, the wheel of a passenger vehicle.

A related object of the invention is to provide running lights that come on when the electrical system of the car fails, so that the running lights are always available as a safety measure.

Another related object is to provide side running lights for a vehicle that may be conveniently added to the lights provided by the manufacturer of the vehicle without being tied into the electrical system of the vehicle or requiring additional devices for attachment to the vehicle.

Moreover, an object of the present invention is to provide a hubcap with lights as a vehicle lighting part that can be conveniently put onto the vehicle in a position at which it can provide side running lights, without requiring an energy source that calls for such inconvenient maintenance as changing batteries.

SUMMARY OF THE INVENTION

These and other objects are accomplished in the present invention by a lighted hubcap assembly that has a cap body of a size and shape not too unlike a style of a conventional hubcap. As it is securable to the wheel of a passenger vehicle, the cap body has an outboard side and an opposing inboard side. When the cap body is mounted to the wheel, the outboard side faces away from the vehicle.

Included with the cap body is a cantilevered bearing mount which extends from the inboard side generally perpendicularly to the cap body.

Contiguous, oppositely polarized magnetic arcuate sections form magnetic north and south poles of a permanent magnet assembly. Each arcuate section is bounded by and affixed to a soft iron hemidisc which is polarized in accordance with the polarity of the arcuate section that the hemidisc bounds. The structure of the permanent magnet assembly is such that it has a center of gravity that is remote from the center of the cap body. Bearings rotatably mount the permanent magnet assembly to the bearing mount, so that, owing to the center of gravity being off the center of rotation of the cap body, the permanent magnet is kept in a substantially fixed orientation with respect to the passenger vehicle when the vehicle wheel rotates relative to the vehicle.

Secured to the inboard side, concentrically about the permanent magnet assembly, are electrically conducting windings. These windings, which are in magnetic flux coupling relationship with the permanent magnet assembly, are electrically connected to light emitting diodes.

The light emitting diodes, preferably three, are mounted to the cap body to emit light from the outboard side of the cap body, when the diodes are energized.

Energization of the diodes takes place upon rotation of the wheel and, concomitantly, the windings about the generally fixedly oriented permanent magnet assembly, which generates current in the windings. The light emitting means may be of various colors to provide a dazzling effect or of a standarized, modified color for safety purposes.

As in any hubcap, the lighted hubcap assembly is installable as a conventional hubcap is mounted to a wheel. Thus, the lighted hubcap assembly instantly provides running lights in addition to whatever lights are provided on the vehicle, including the wheel on which the hubcap is installed. Because of the selfcontained generator in the assembly, no batteries whatsoever are required and the lights are energized whenever the wheel rotates.

BRIEF DESCRIPTION OF THE DRAWINGS

A better understanding of the invention will be had by now referring to a preferred embodiment as illustrated in the accompanying drawings in which.

DESCRIPTION OF THE PREFERRED EMBODIMENTS

Figure 1:
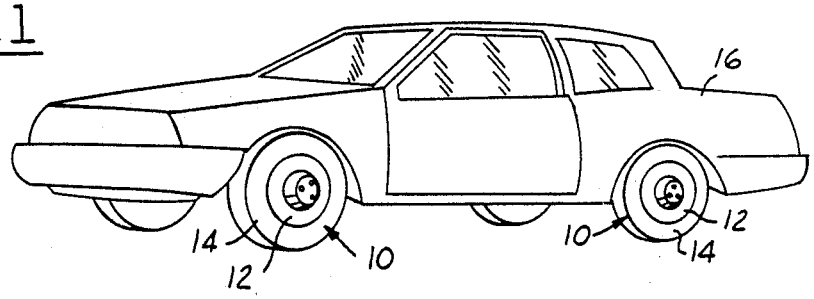
FIG. 1 is a view of a passenger vehicle with wheels having hubcaps that incorporate the lighted hubcap assembly in accordance with the present invention.

Referring now to the drawings more in detail, in particular FIG. 1, a lighted hubcap assembly, shown generally at 10, is installed on wheel 12 mounting a tire 14 on passenger vehicle 16. The hubcap 10 may be either factory provided or installed in place of a factory provided hubcap. For the conventional type of passenger vehicle 16 suggested by the drawing, up to four such lighted hubcap assemblies 10 may be provided for the up to four wheels of the vehicle 16. The wheels may be standard size for the particular vehicle 16 or a custom size for a customized appearance. Accordingly, the lighted hubcap assemblies 10 may be of a standard size or a customized size for particular wheels.

Figure 2:
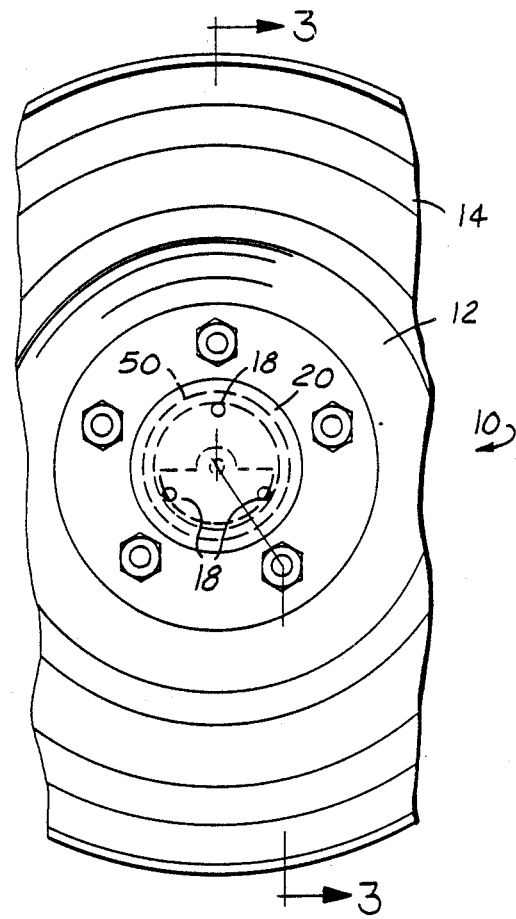
FIG. 2 is an enlarged, partial view of a wheel on the vehicle illustrated in FIG. 1, showing the outboard side of the lighted hubcap assembly that is the subject matter of the present invention and indicating by hidden line convention the location of the permanent magnet assembly and the windings of the invention.

Turning to FIG. 2, the hubcap assembly 10 on wheel 12 is shown to have at lest one light emitting diode 18. In the preferred embodiment, three such diodes 18 are spaced about the hubcap assembly 10 as is illustrated. The symmetry of the spacing of the diodes 18 allows for a variety of lighting effects to be best produced. Accordingly, when all of the lights are yellow, a circular, almost neon effect is produced at certain revolutionary speeds of the wheels 12. Alternatively, particularly when the diodes are wires to flash an alternatingly to produce alternating colors in strobe effect, one light may be yellow and two of the lights red so as to compensate for the brighter appearance of the yellow light.

Figure 3:
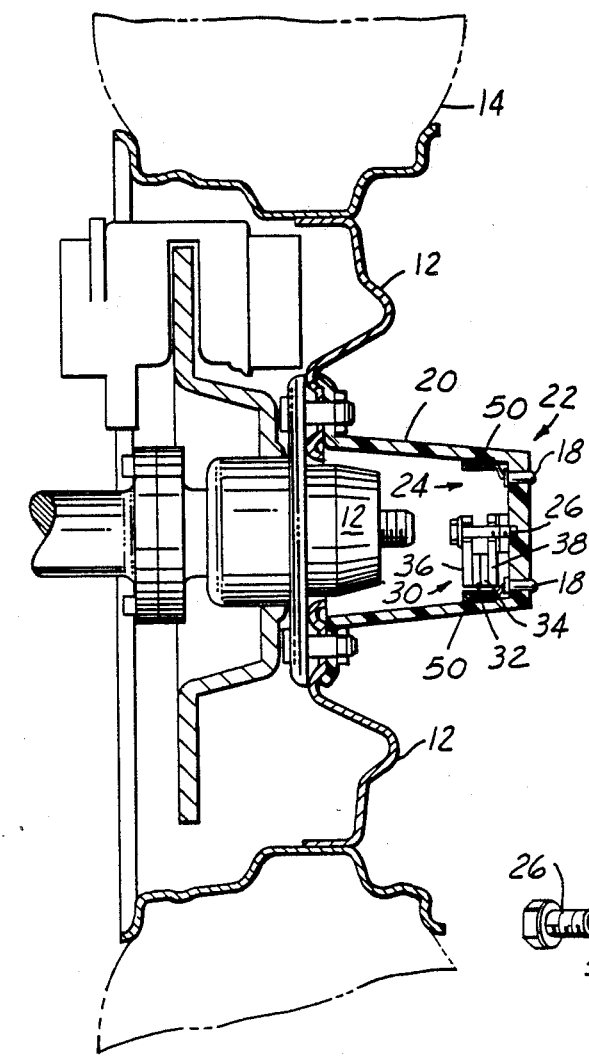
FIG. 3 is an enlarged sectional view of the wheel shown in FIG. 2, taken substantially along meandering line 3—3 in the direction of the arrows.

Turning now to FIG. 3, which shows a cross section of the hubcap assembly 10, the hubcap assembly 10 is seen to have a cap body 20. The cap body is secured to the wheel 12 of the vehicle 16 by means known by those of ordinary skill in the hubcap art. In this embodiment, the hubcap is secured by nut and bolt arrangement. As it is securable to the wheel 12 of a passenger vehicle 16, as it is shown in FIG. 1, the cap body 20 has an outboard side 22 and an inboard side 24. When the cap body 20 is mounted to wheel 12, the outboard side 22 faces away from the vehicle 16 so that, with respect to the display of light emitted from them, the light emitting diodes 18 are considered to be spaced about the outboard side of the cap body 20. As will be explained, it is necessary that the diodes 18 communicate electrically through to the inboard side 24; thus, it is to be appreciated that the particular structure illustrated with the diodes 18 extended through the cap body 20 so as to be seated therein is not a limitation of the invention.

Still referring to FIG. 3, the cap body is shaped as to clear the hub of the wheel 12 sufficiently for a bearing mount 26 to extend as a cantilevered structure from the inboard side 22 of the cap body 20, generally perpendicularly to the cap body 20. In the preferred embodiment, the bearing mount 26 is a machine bolt threadable received in the cap body 20, but in other embodiments the baring mount 26 may be a structure that is integral with the cap body 20.

Figure 4:
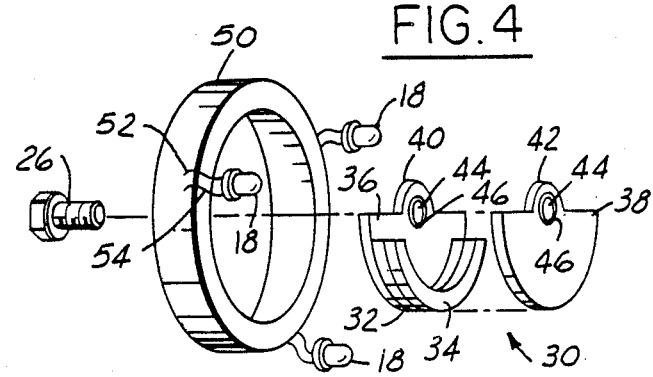
FIG. 4 is an exploded view of the permanent magnet assembly and coil assembly of the invention.

Still referring to FIG. 3 and in addition FIG. 4, the hubcap assembly 10 also has a permanent magnet assembly 30. Permanent magnet assembly 30 is comprised of contiguous, oppositely polarized magnetic arcuate sections 32 and 34 which form together a north pole and a south pole, respectively, of the permanent magnet assembly 30. Thus if, for example, arcuate section 32 is a north pole, arcuate section 34 would be a south pole. Each arcuate section, 32 and 34, is bounded by and affixed to a soft iron hemidisc, 36 and 38, respectively. The soft iron hemidiscs 36 and 38 are polarized in accordance with the polarity of the respective arcuate section 32 and 34 that bounds the hemidisc 36 and 38. In the example, then, hemidiscs 36 which is bound arcuate section 32 would be a north pole and hemidisc 38 which is bound arcuate section 34 would be a south pole. Consequently, hemidiscs 36 and 38 are also a part of the permanent magnet assembly 30.

In a manner now to be explained, bearings 46 rotatably mount the permanent magnet assembly 30 to the bearing mount 26 so that the permanent magnet assembly 30 generally is in a fixed orientation, notwithstanding revolution of the cap body 20. Hemidiscs 36 and 38 have mounting lugs 40 and 42, respectively, projecting from their respective straight sides. The mounting lugs 40 and 42 each have an aperture 44 which receives the bearing mount 26. A bearing 46, preferably a ball bearing, is disposed in each aperture 44 between each lug 40 and 42 and the bearing mount 26. It is to be appreciated that the permanent magnet assembly 30 accordingly is made to depend from the bearing mount 26 with the center of gravity of the permanent meant assembly 30 disposed remotely from the center of the cap body 20 from which the baring mount 26 generally perpendicularly extends. Any tendency for the permanent magnet assembly 30 to rotate with a rotation of the bearing mount 26, which rotates with the cap body 20 and the wheel 12, will produce a moment generated by the force of gravity to realign the permanent magnet assembly 30 to a substantially fixed orientation. Thus, the structure of the permanent magnet assembly 30 provides weighted means for weighting the permanent magnet assembly 30 in a generally fixed orientation with respect to the passenger vehicle 16.

It is preferred that the bearing 46 not need lubrication; however, lubrication orifices 48 are provided to angle inwardly from the outboard side 22 to the inboard side at the bearing mount 26.

Electrically conducting windings 50 are secured to the inboard side 24 of the cap body 26 so that the windings 50 are concentrically about the permanent magnet assembly 30. The windings 50 are in magnetic flux coupling relationship with the permanent magnet assembly 30.

Outlet leads 52 and 54, electrically connect windings 50 to the light emitting diodes 18, preferably to the three light emitting diodes 18 as shown in FIG. 2, which are mounted on the cap body 20 so that light from the diodes 18 is emitted from the outboard side 22 when the diodes 18 are energized.

When the wheel 12 and, concomitantly, the cap body 20 and the windings 50 rotate, the permanent magnet assembly 30 remains in a generally fixed orientation, so that the winding 50 revolve about the permanent magnet assembly 30, and thereby generates a current in the windings for energizing the light emitting means.

As is known to other arts and is now disclosed by the present invention, including its incorporation of the Detailed Description of the Preferred Embodiment in U.S. Pat. No. 4,2298,910 issued to Price, the light emitting diodes 18 are polarized to the extent that the light will only be energized when current passes through the terminals of the diodes 18. Accordingly, in the apparatus discussed by Price in U.S. Pat. No. 4,298,910, the diodes may be wired in such a manner as to allow polarity reversal on the leads 52 and 54 to produce dazzling effects as the wheels 12 of the vehicle 16 rotate.

Because of the self-contained generator in the lighted hubcap assembly 10, no batteries whatsoever are required and the lights are energized whenever the wheel rotates.

It will be understood that various modifications may be made to the assembly and the method of using it without departing from the purview of the appended claims.

We claim:

1. A lighted hubcap assembly comprising:
    a cap body having an outboard side and an opposing inboard side, the cap body for securement to the wheel of a passenger vehicle with the outboard side facing away from the vehicle, the cap body including a cantilevered bearing mount extending from the inboard side generally perpendicularly to the cap body;
    a permanent magnet assembly including contiguous, oppositely polarized magnetic arcuate sections forming together a north side and a south side, each side being bounded by and affixed to a soft iron hemidisc which is polarized in accordance with the polarity of the arcuate section that bounds the hemidisc, the permanent magnet assembly having a center of gravity disposed remotely from the bearing mount, so that any tendency for the permanent magnet assembly to rotate with a pivoting of the bearing mount, which rotates with the cap body, will produce a moment generated by the force of gravity to realign the permanent magnet assembly to a substantially fixed orientation;
    bearings rotatably mounting the permanent magnet assembly to the bearing mount of the permanent magnet assembly so that the permanent magnet assembly is kept in a substantially fixed orientation with respect to the passenger vehicle when the vehicle wheel rotates relative thereto;
    at least one light emitting diode mounted on the cap body so that light from the diode is emitted from the outboard side of the cap body when the diodes are energized;
    electrically conducting windings secured to the inboard side concentrically about the permanent magnet assembly and connected to the light emitting means, the windings being in magnetic flux coupling relationship with the permanent magnet assembly so that upon rotation of the wheel and, concomitantly, the windings about the generally fixedly oriented permanent magnet assembly, alternating current is generated in the winding for energizing the light emitting means.

2. The lighted hubcap assembly of claim 1 wherein the bearings rotatably mounting the permanent magnet assembly are ball bearings.

3. The lighted hubcap assembly of claim 1 wherein the bearings rotatably mounting the permanent magnet assembly are ball bearings.

* * * * *